United States Patent [19]

Parkes

[11] 3,804,583
[45] Apr. 16, 1974

[54] BAKING OVEN
[76] Inventor: Ralph C. Parkes, 2701 N. Hancock, Rydall, Pa. 19133
[22] Filed: Feb. 20, 1973
[21] Appl. No.: 333,741

[52] U.S. Cl. ............................. 432/230, 432/141
[51] Int. Cl. ............................................. F27b 9/14
[58] Field of Search ........... 432/204, 230, 231, 141, 432/144, 145

[56] References Cited
UNITED STATES PATENTS
2,106,052  1/1938  Faulds................................. 432/141
3,381,391  5/1968  Yunghahn........................... 432/145

Primary Examiner—John J. Camby
Attorney, Agent, or Firm—Louis Necho

[57] ABSTRACT

A proofer and baking oven including an enclosure, a conveyor carrying the goods to be baked through the oven and arranged to transport a plurality of baking trays in a series of vertically upwardly and downwardly directed passes through the oven. Heated air intake and discharge nozzles are positioned to direct heated air horizontally through the baking chamber across the vertical passes of the conveyor. Baking trays of generally square cross-sectional configuration and having baking cups on opposed sides are carried through the baking oven by the conveyor. Guide means are provided within the oven interior to hold the baking trays in upright position throughout the paths of vertical travel and horizontal travel and when the conveyor turns about its associated sprockets at the termination of each pass. Each baking tray is provided with endwardly positioned weights which are vertically able and act to retain the desired upright orientation of the baking trays during travel through the oven and further act to jolt the trays for product release following the baking operations when the trays are rotated through 180°.

14 Claims, 10 Drawing Figures

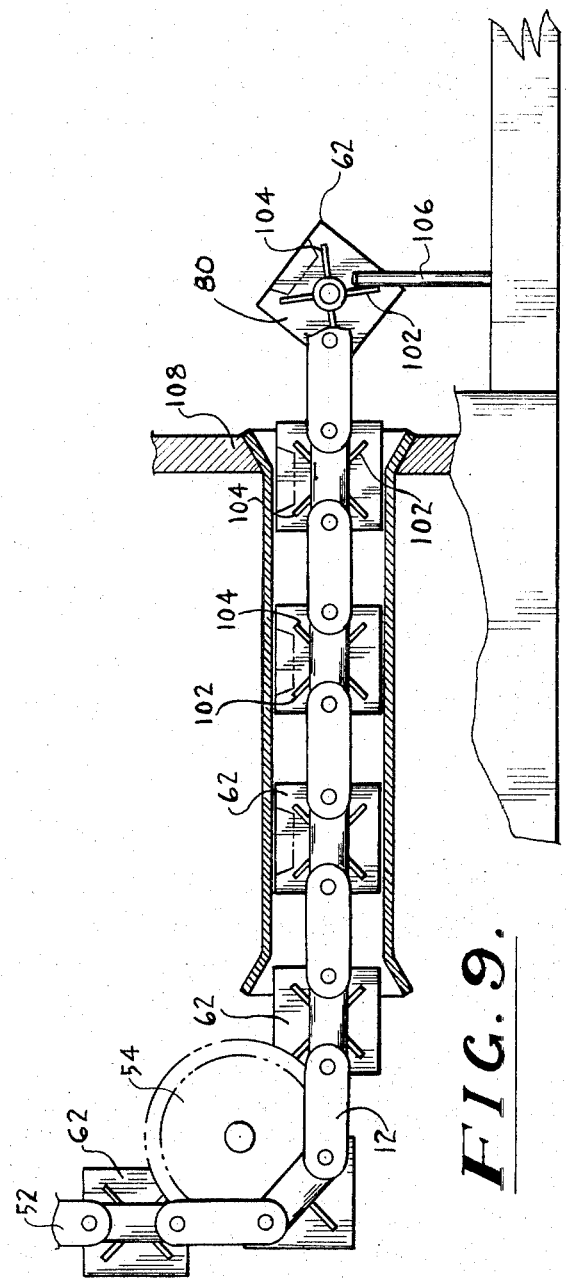

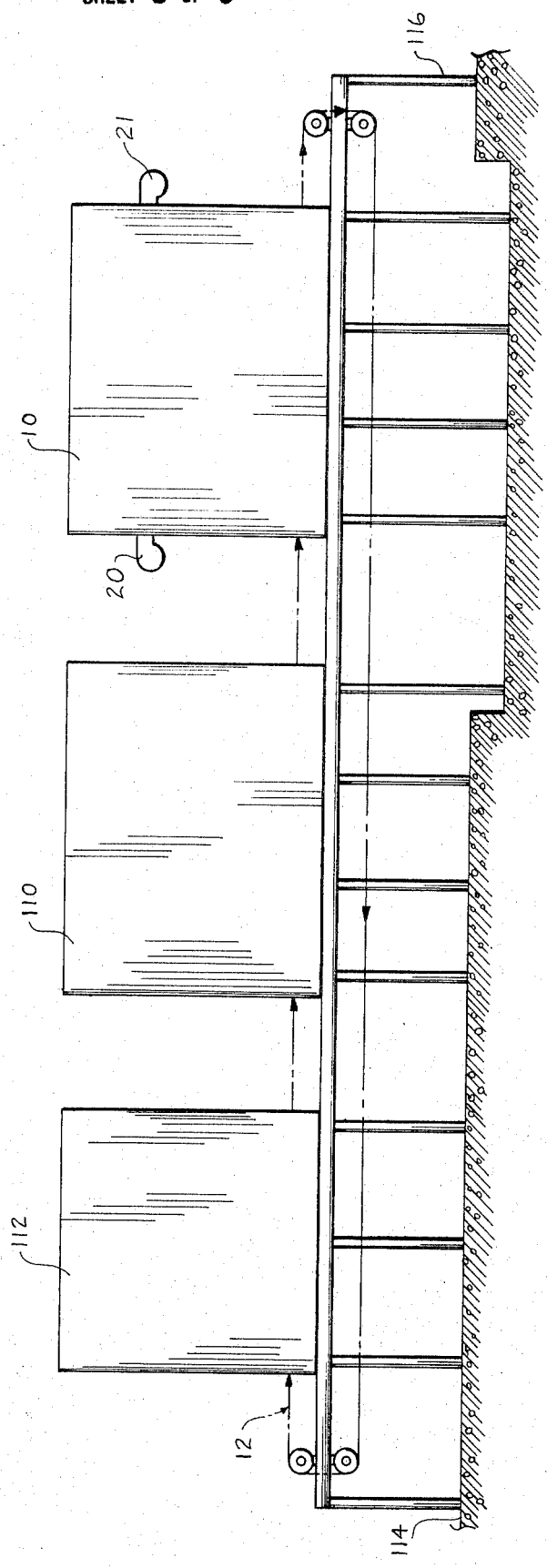

BAKING OVEN

BACKGROUND OF THE INVENTION

The present invention relates generally to the field of baking, and more particularly, is directed to a conveyor fed, automatic, continuous type of baking oven and proofer.

Automatic baking ovens have been developed by prior workers in the field to automatically bake such goods as rolls, cupcakes, cookies, pies and the like by employing large, elongate ovens and conveyors to carry the product through the oven during the baking procedures. The prior art ovens were generally massive in construction and normally applied radiant heat for baking purposes. In order to develop uniform radiant heat, heavy cast iron and refractory interior designs were employed and usually such ovens developed very low thermal or forced draft. The conveyors were normally operated in a substantially horizontal plain and baking trays were randomly placed upon the moving belt prior to entering the oven.

Due to the elongate nature of the oven to accommodate the horizontally moving conveyor belts and the mass necessitated by the metallic and refractory constructions required to develop uniform radiant heat within the oven interior, the prior art ovens were costly in construction, expensive in operation and required extensive floor areas to receive the conveyor belt and to facilitate producing a satisfactory end product.

SUMMARY OF THE INVENTION

The present invention relates generally to the field of baking ovens and more particularly, is directed to an oven which employs a conveyor suitable for carrying the goods to be baked and proofed through a series of vertical spaced passes in a heated or humid atmosphere.

The present invention includes a proofer oven inclosure which defines a baking area through which the conveyor functions to carry the goods to be baked through a series of vertical up and down passes. A plurality of heated air discharge nozzles convey heated air horizontally through the oven interior at various elevations and a plurality of cooperating air intake nozzles position opposite the air discharge nozzles in vertical alignment therewith to develop uniform horizontal air flow across various elevations within the oven interior.

The conveyor is of the endless belt type and carries a plurality of baking trays of generally rectangular cross sectional configuration in a manner to permit the trays to remain upright during all of the vertical passes and horizontal movements of the trays during the baking operations. Guide means within the oven position adjacent to the path of the conveyor to maintain the trays in upright orientation during all periods of operation to prevent tipping of the trays and improper peaking of the product.

Each tray is provided with end positioned weights which are slidable within channels to maintain the upright position of a tray. By turning the tray through 180° the weights slide within their respective channels and serve to both jolt the trays for product release upon completion of the baking cycle and to maintain the tray in its reverse position for receipt of a new product. Preferably each oven tray carries two series of baking pans, one on top and one underneath to avoid the necessity of changing oven trays when changing to another product.

Air flows through the oven is controlled by primary and secondary air controlled nozzles to assure uniform air flow in a horizontal direction. The conveyor serves to carry the trays and the products to be baked vertically upwardly and downwardly through the horizontal air flow to thereby provide a uniform exposure of heat to all products within the various trays.

It is therefore an object of the present invention to provide an improved baking oven of the type set forth.

It is another object of the present invention to provide a novel baking oven which incorporates a conveyor belt which carries baking trays through a series of vertically directed upward and downward passes through the oven interior.

It is another object of the present invention to provide a novel baking oven which incorporates heated air discharge nozzles and heated air intake nozzles which horizontally align and cooperate to provide horizontally directed heated air paths through the oven interior for baking purposes.

It is another object of the present invention to provide a novel baking oven which includes an endless conveyor carrying baking trays through a series of vertical upward and downward passes between controlled air flow nozzles through the oven interior and which further includes guide means to hold the trays in vertical alignment during all periods of travel through the oven.

It is another object of the present invention to provide a novel baking oven which includes a conveyor system carrying the plurality of trays, each tray carrying positioned weights which slide within guides to maintain the tray in either of two vertical arrangements.

It is another object of the present invention to provide a novel baking oven which incorporates an endless conveyor and pans carried by the conveyor in a "ferris wheel" type of carrier to permit uniform location of each pan relative to the conveyor to facilitate additional operations such as forming after proofing or the application of additional materials.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 9 is an enlarged, side elevational view of the conveyor discharge from the baking oven in the delineated area of FIG. 1.

FIG. 10 is a schematic, side elevational view of a proofer and oven arrangement.

DESCRIPTION OF THE PREFERRED EMBODIMENT OF THE INVENTION

Figure 1:
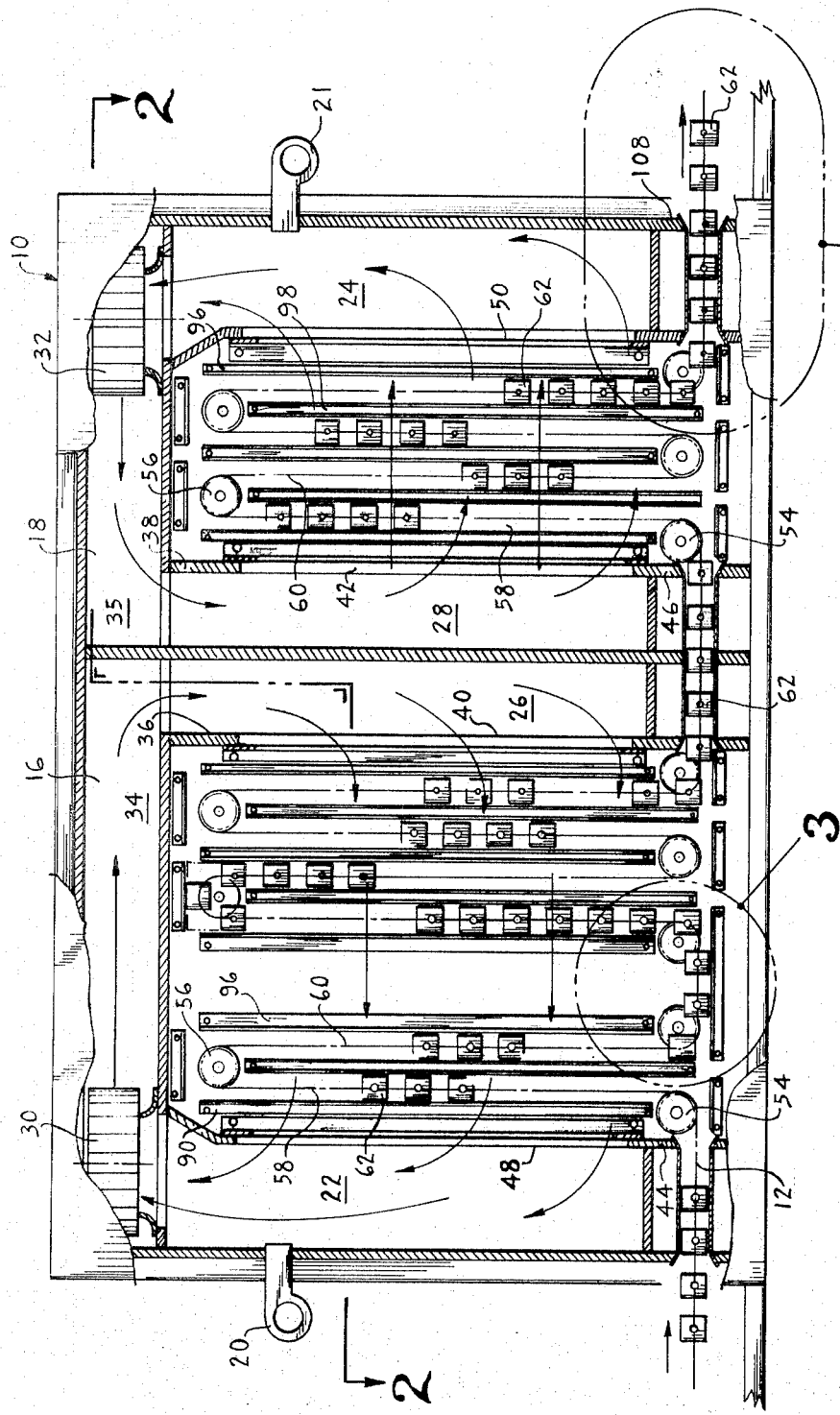
FIG. 1 is a side elevational view of a baking oven constructed in accordance with the present invention, partially broken away to expose details of internal construction.

Although specific terms are used in the following description for the sake of clarity, these terms are intended to refer only to the particular structure of my invention selected for illustration in the drawings and are not intended to define or limit the scope of the invention.

Figure 2:
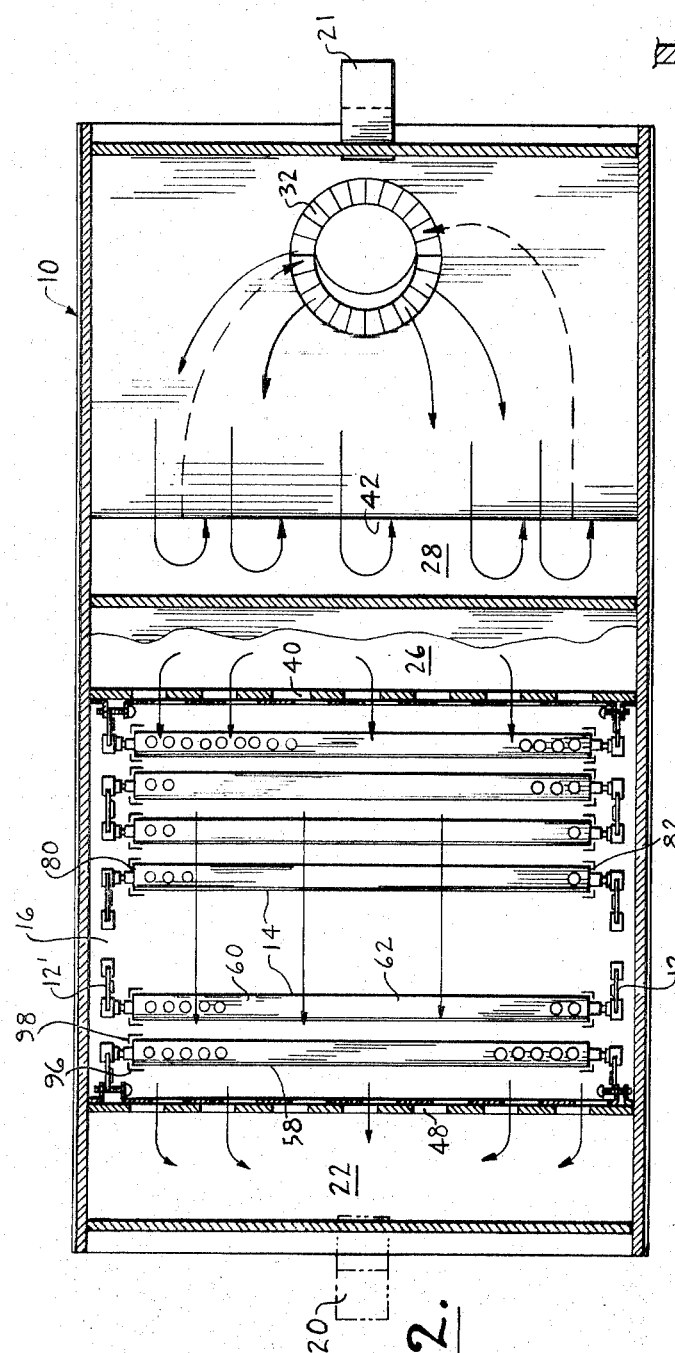
FIG. 2 is a cross sectional view taken along Line 2—2 of FIG. 1, looking in the direction of the arrows.
Figure 4:
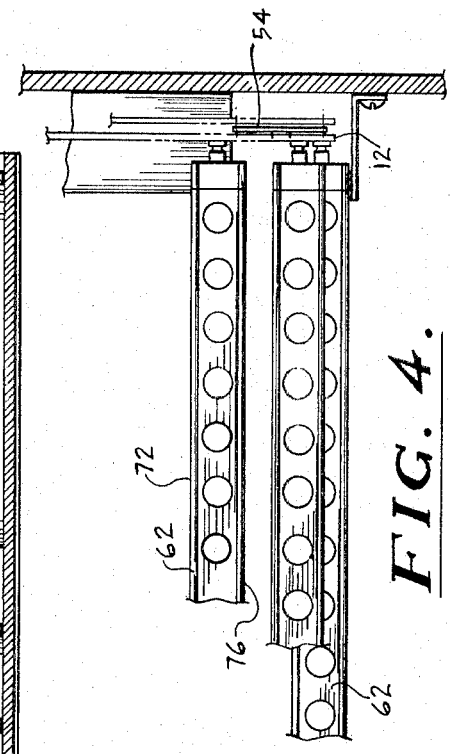
FIG. 4 is an end elevational view of the conveyor bottom construction taken along Line 4—4 of FIG. 3.

Referring now to the drawings, I shown in FIGS. 1 and 2 a baking oven 10 through which a conveyor 12 carries a plurality of spaced baking trays 14 for baking purposes. In the embodiment illustrated, the oven is subdivided into two compartments namely, a forward air flow oven proofer 16 and a reverse air flow oven proofer 18. However, more or fewer compartments may be similarly employed and still fall within the scope and intent of the invention. The conveyor 12 may be integral within the baking oven 10 or preferably, can be arranged to convey the baking trays 12 from associated, generally similar equipment (not shown), such as a dry proof section or a proof section wherein conventional baking operations such as proofing, forming, condiment application and similar well known functions can be carried out.

The forward air plenum areas 16, 18 are generally similarly constructed but opposed for uniform coloring and are equipped with a gas or oil burner 20,21 each of which serve to heat the respective inlet air plenums 22,24 which position down stream from the respective heated air plenums 26,28. Circulating fans 30,32 position within the respective plenum areas 16,18 each having their respective suctions connected to a return air plenum 22,24 to receive the heated air from within the areas 16,18. The fans 30,32 each discharge horizontally across their respective fan discharge plenums 34,35 which plenums serve to direct the heated air under fan pressure downwardly through the respective heated air plenums 26,28 for baking purposes. The plenum inlet walls 36,38 adjacent respective the heated air plenums 26,28 are each provided with air flow control means in the form of a plurality of adjustable air discharge nozzles 40,42 which serve to introduce the heated air from the fan discharge substantially uniformly over the entire surface of each oven wall 36,38. The plenum walls 44, 46 of the return air plenums 22, 24 are similarly provided with a plurality of adjustable air intake nozzles 48, 50 which substantially cover the entire surface of the respective oven walls 44, 46. Thus, heated air from the circulating fans 30, 32 enters the plenum areas 16 and 18 horizontally throughout the entire height and width of the respective areas 16, 18 through action of the associated adjustable air discharge nozzles 40, 42. The air travels horizontally across the steaming and baking areas 16 18 and enters the opposed adjustable air intake nozzles 48, 50 which serve to encourage the heated air to travel horizontally across the oven interior areas. Thus, while it is well known that heated air rises, the combination of the horizontally opposed air pressure discharge nozzles 40, 42 and the air vacuum intake nozzles 48, 50 and the pressures developed by the fans 30, 32 serve to produce uniform oven interior temperatures in horizontal strata across the oven 10. In this manner, the air temperature at any chosen elevation within the oven interior will be held substantially constant.

Figure 3:
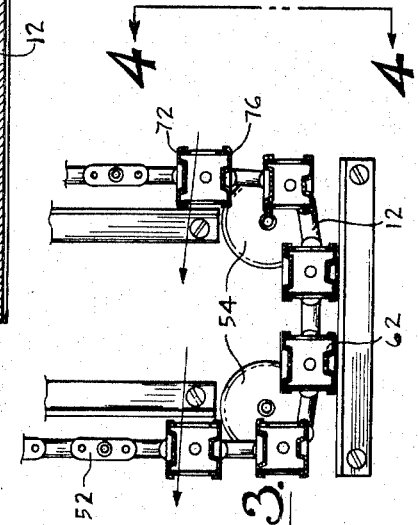
FIG. 3 is a partial, enlarged, elevational view of the bottom conveyor area delineated in FIG. 1.

The conveyor 12,12' is preferably of the chain link type and includes a plurality of links 52 which are pinned together in conventional manner for usual chain conveyor purposes. (see FIGS. 3 and 9). The chain conveyor 12 passes about a plurality of lower sprockets 54 and upper sprockets 56 to form a plurality of vertical upward passes 58 and a plurality of vertical downward passes 60 within the oven interior areas 16,18. A plurality of baking trays 62 are pivotally connected to the chain conveyor 12, 12' and are carried throughout the proofer and baking oven 10 in a manner to maintain the vertical orientation of each tray in the manner hereinafter more fully set forth.

Figure 7:
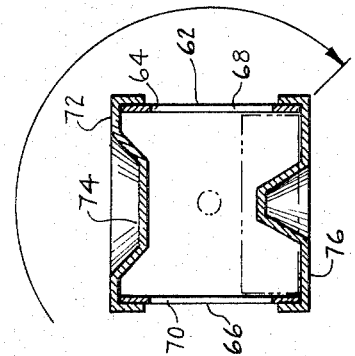
FIG. 7 is a cross-sectional view taken along Line 7—7 of FIG. 5, looking in the direction of the arrows.
Figure 6:
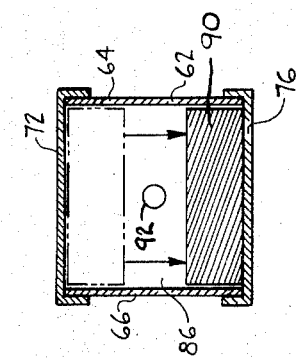
FIG. 6 is a cross sectional view taken along Line 6—6 of FIG. 5, looking in the direction of the arrows.
Figure 5:
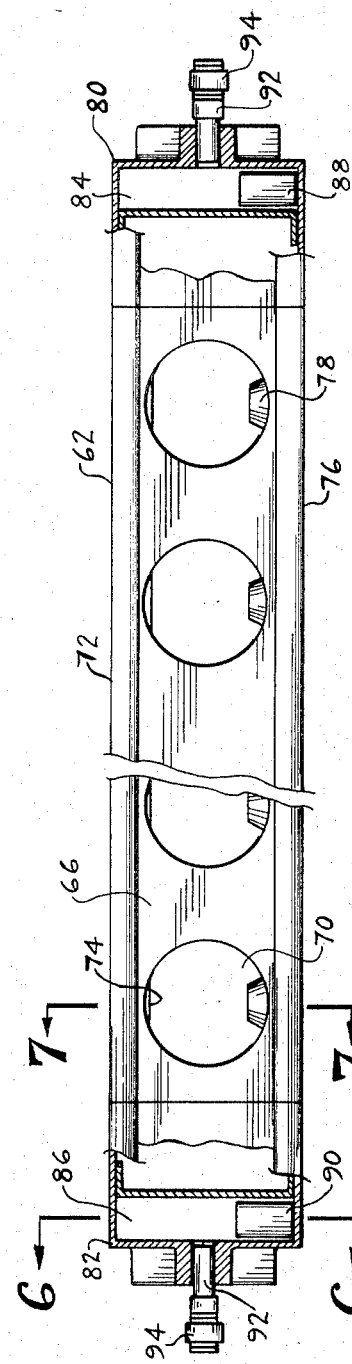
FIG. 5 is an enlarged, side elevational view of a baking tray, partially broken away to expose details of interior construction.

As best seen in FIGS. 5, 6 and 7, each baking tray 62 is preferably rectangularly formed of suitable, heat resistant material such as sheet aluminized or sheet galvinized steel of sufficient length to extend substantially across the entire width of the baking oven 10. The sides 64, 66 of each baking tray 62 are provided with a plurality of longitudinally spaced, transversely opposed openings 68, 70 which are quite large relative to the height of the sides 64, 66 and which function to permit the heated air from the circulating fans 30, 32 to readily pass therethrough in the aforesaid horizontal stratas. Thus, even though many baking trays 62 may be carried by the conveyor 12 in a plurality of a vertical passes 58, 60 there will be no substantial interference to the flow of heated air through the oven interior areas 16, 18. Additionally, it should be noted that even though there may be a horizontal variation in temperature due to product moisture evaporation as air passes from 40 to 48 or 42 to 50, the plurality of vertical upward and downward passes 58,60 of the product to be baked as it advances, through baking chamber provides uniform exposure of heat to the product. Still referring to FIGS. 5, 6 and 7, it will be noted that the top surface 72 of each baking tray 62 is provided with a pan series of a first configuration 74 to produce a baked product of a first configuration. Similarly, the bottom surface 76 is provided with a pan series of a second configuration 78 to produce a baked product of a desired second configuration 78. Thus, by simply rotating a baking tray 62 through 180° a baked product of a second configuration can be readily produced without extensive downtime to change pan configurations. The respective right and left ends 80,82 or intermediate like compartments of each baking tray 62 are provided with orientation means in the form of weight guide compartments 84,86 which loosely hold and guide a lead or other dense material weight 88, 90 which are freely vertically slidable within the respective compartments 84, 86.

Figure 8:
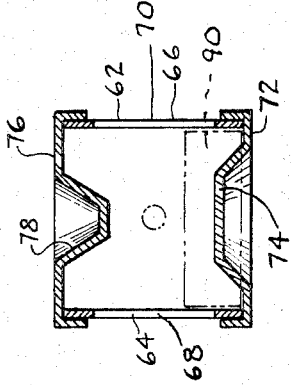
FIG. 8 is a cross sectional view similar to FIG. 7 showing the baking tray rotated through 180°.

As best seen in FIG. 5, each baking tray is endwardly fixed to the conveyor 12, 12' in pivotal connections, which may be a conventional shaft 92 which acts within a bearing 94 in well known manner. Thus, the baking trays 62 connect to the chain conveyor 12, 12' in a "ferris wheel" type of carrier wherein the transversely spaced weights 88, 90 serve to orient each baking tray 62 in vertical position during all periods of travel of the baking trays through the oven and proofer 10. When the top surface 72 is positioned upwardly, the weights 88, 90 drop into contact with the bottom surface 76 and tend to maintain the upward orientation of the top surface 72, by lowering the tray center of gravity below the shafts 92. When the baking trays 62 are rotated through 180° so that the bottom surface 76 shown in FIG. 5 is positioned upwardly, the weights 88, 90 fall within their respective guide compartments 84, 86 and thereby tend to maintain the upward orientation of the bottom surface 76. Thus, the weights 88, 90 are employed to maintain an upwardly directed pan top surface 72 or bottom surface 76 in an upward position depending upon its initial orientation prior to entering the oven 10. FIG. 8 illustrates the condition wherein the baking tray 62 has been rotated through an arc of 180° so that the former bottom surface 76 positions upwardly and wherein the weights 88, 90 serve to maintain the upward orientation of the surface 76.

As best seen in FIG. 2, each vertical upward pass 58 and vertical downward pass 60 within the baking oven 10 is provided with tray alignment means 96 which may be in a form of angle iron vertical brackets 98 which are laterally positioned relative to each baking tray 62. The tray alignment means 96 position adjacent each side 64, 66 of the baking trays 62 at the respective ends 80, 82 thereof as they are directed through the upward and downward vertical passes 58, 60 to maintain the vertical orientation of each baking tray 62 throughout its entire travel within the baking oven interior areas 16, 18. Thus, once either the first pan configuration 74 or the second pan configuration 78 of each baking tray 68 is filled with the desired product prior to baking, both the weights 88, 90 and the tray alignment means 96 cooperate to assure that the pan bearing the desired, filled pan configuration remains upright during all of the processing and baking operations performed within the apparatus.

As best seen in FIG. 9, one end 80 of each baking tray 62 is preferably provided with laterally extending cross arms 102, 104 which project outwardly from the baking tray end 80 a sufficient distance to be engaged individually by the stationary finger 106 which is positioned at the discharge end 108 of the baking oven 10. As the conveyor 12, 12' carries the baking trays 62 exteriorly of the oven 10 with the fully baked product (not shown) contained within either the first or second configuration pans 74, 78 a cross arm 102 or 104 is engaged by the stationary finger 106. Continued movement of the chain conveyor 12, 12' causes the baking tray 62 to be rotated about the bearings 94 as the conveyor continues to move. The geometry of the system is calculated to rotate each baking tray 62 through an arc of more than 90° wherein the weights 88, 90 become unbalanced within their respective guide compartments 84, 86. The weights 88, 90 shift by gravity from their association with the tray bottom surface 76 as in FIGS. 5 and 6 to an associated position with the top surface 72 as in FIG. 8. It is the purpose of this invention to cause the weights 88, 90 to be freely slidable within their respective compartments 84, 86 so that upon rotation of each baking tray through more than 90°, the weights 88, 90 will shift within the compartments 84, 86 and contact the opposite surface with sufficient momentum to jolt the trays to facilitate product release at the discharge end 108. Thus, the weights 88, 90 serve two purposes, namely, to maintain each baking tray 62 in a desired position of first or second pan upright orientation and also to act as a ram to shake the fully baked product free of the associated pan when the pan is rotated through 180°.

In FIG. 10, I show a schematic arrangement employing a baking oven 10 wherein the same conveyor 12 is employed to carry baking trays (not shown) through other similar cooperating structures such as a proofing enclosure 110 and a dry proofing enclosure 112. It will be appreciated that the baking trays remain affixed to the conveyor throughout the entire length of travel in their same relative positions so that automatic, repetitive operation such as forming or condiment additions to the product contained within the baking pans 74, 78 can readily be accomplished. In the arrangement illustrated, the oven 10 and the enclosures 110, 112 are shown supported above the floor 114 by a plurality of vertical supports 116. This arrangement is illustrative only and other equipment positions can easily be designed and still fall within the scope and meaning of this invention.

Although I have described the present invention with reference to particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended thereto.

I claim:

1. In a baking oven, for baking food products, the combination of
   a. an enclosure
      i. said enclosure being subdivided into a baking area having two sides, a return air plenum and an input air plenum,
      ii. said return air plenum and input air plenum being provided with air flow control means and being arranged with respect to the baking area to permit heated air from the input air plenum to travel through the baking area to enter the return air plenum;
   b. a conveyor carrying the food products to be baked through the baking area,
      i. said conveyor turning about upper and lower sprockets to divide its path of travel through the baking area into a plurality of upwardly and downwardly directed passes;
   c. a plurality of baking trays affixed to the conveyor in spaced relationship,
      i. said baking trays being provided with pivotal means to permit the baking trays to rotate relative to the conveyor,
      ii. said baking trays each having a top, a bottom, a first side, a second side, a right end and a left end; and
   d. orientation means associated with each baking tray to maintain an initial upper orientation of each baking tray during the path of travel through the baking area,
      i. said orientation means including components capable of movement relative to the associated baking tray.

2. The invention of claim 1 wherein the orientation means comprise a weight guide compartment and a weight slidable within the weight guide compartment, said weight being less in height then the distance between the said tray top and tray bottom.

3. The invention of claim 2 wherein the first and second sides are provided with respective first and second air passage openings, the said openings having a diameter which is large relative to the height of the sides.

4. The invention of claim 3 wherein the first and second air passage openings are horizontally aligned to facilitate the passage of heated air therethrough.

5. The invention of claim 4 and a first baking pan of first configuration provided in the said top and a second baking pan of a second configuration provided in the said bottom, the said baking trays being rotatable relative to the conveyor to orient either said first or second baking pan upwardly within the baking area.

6. The invention of claim 5 and tray alignment means provided in the baking oven to maintain the said initial upper orientation.

7. The invention of claim 6 wherein the tray alignment means comprise vertical brackets affixed to the baking oven, said brackets aligning near the baking tray sides to prevent rotation of a baking tray within its pivotal connection within the baking oven enclosure.

8. The invention of claim 1 wherein the air flow control means include a first plurality of nozzles formed in the input air plenum and a second plurality of nozzles formed in the return air plenum.

9. The invention of claim 8 wherein the first plurality of nozzles position on one side of the baking area and the second plurality of nozzles position on the second side of the baking area.

10. The invention of claim 9 wherein the first and second nozzles horizontally align.

11. The invention of claim 10 wherein the first and second nozzles direct the heated air through the baking area in horizontal, uniform temperature stratas.

12. The invention of claim 5 and baking tray rotation means associated with each baking tray to rotate the baking tray through one hundred and eighty degrees upon completion of the baking operations.

13. The invention of claim 12 wherein the rotation means include an arm extending outwardly from one of the baking tray ends and a fixed finger or cam positioned exteriorly of the baking area, the conveyor carrying the arm into contact with the finger for tray rotative or positioning purposes.

14. The invention of claim 13 wherein the arm is configured in the form of a cross.

* * * * *